(12) United States Patent
Scoccia et al.

(10) Patent No.: US 6,422,301 B1
(45) Date of Patent: Jul. 23, 2002

(54) DUAL FUNCTIONAL DRAIN FOR A HEATING, VENTILATING, AND AIR CONDITIONING ASSEMBLY

(75) Inventors: Ardeean Scoccia, Amherst; Garrett Wade Hoehn, Kenmore, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/638,480

(22) Filed: Aug. 14, 2000

(51) Int. Cl.⁷ .............................................. B60H 1/00
(52) U.S. Cl. ..................................... 165/42; 62/244
(58) Field of Search ............................. 165/41, 42, 43; 62/244

(56) References Cited

U.S. PATENT DOCUMENTS

| | | | |
|---|---|---|---|
| 4,956,979 A | | 9/1990 | Burst et al. .................... 62/244 |
| 5,711,368 A | * | 1/1998 | Ito et al. ........................ 165/42 |
| 5,755,107 A | * | 5/1998 | Shirota et al. ............. 165/42 X |
| 5,927,380 A | | 7/1999 | Scoccia ..................... 165/11.1 |
| 6,029,739 A | | 2/2000 | Izawa et al. ................... 165/42 |
| 6,129,140 A | * | 10/2000 | Kawahara ..................... 165/42 |
| 6,351,962 B1 | * | 3/2002 | Mizutani et al. .............. 62/244 |

* cited by examiner

Primary Examiner—Ljiljana Ciric
(74) Attorney, Agent, or Firm—Patrick M. Griffin

(57) ABSTRACT

A heating, ventilating, and air conditioning (HVAC) assembly for a motor vehicle includes an evaporator core for cooling air and a heater core for heating air. A heater casing of the HVAC assembly surrounds the heater core. A drain portion of the HVAC assembly extends from the heater casing and includes a partition. The partition defines two basins in the drain portion for separate drainage of evaporator condensate generated at the evaporator core and liquids from the heater core.

22 Claims, 3 Drawing Sheets

DUAL FUNCTIONAL DRAIN FOR A HEATING, VENTILATING, AND AIR CONDITIONING ASSEMBLY

TECHNICAL FIELD

The subject invention generally relates to a heating, ventilating, and air conditioning (HVAC) assembly for a motor vehicle. More specifically, the subject invention relates to a HVAC assembly that includes a drain portion having a partition that separates condensate from an evaporator and liquid from a heater core of the assembly.

BACKGROUND OF THE INVENTION

Heating, ventilating, and air conditioning (HVAC) assemblies for motor vehicles are well known in the art. Conventional HVAC assemblies include an evaporator core for cooling air and a heater core for heating air. As appreciated by those skilled in the art, the evaporator core generates condensate as it cools the air. As a result, a drain must be incorporated into the HVAC assembly to collect and drain the condensate.

In these conventional assemblies, the drain for the condensate from the evaporator extends from a casing for the evaporator core, through a front-of-dash wall of the vehicle, and into an engine compartment of the vehicle where the condensate drains to the ground. A casing for the heater core also includes a drain for collecting and draining any liquid, such as condensate from the heater core or possibly even engine coolant, away from a passenger compartment of the vehicle. The drain for the liquid from the heater core extends from the casing for the heater core, and also through the front-of-dash wall and into the engine compartment.

It is understood that the evaporator core may require repair service or other maintenance for various reasons. To access the evaporator core in the HVAC assembly, a repair operator must remove the casings for both the evaporator core and the heater core. To remove these casings, the operator must first pull the drains for both cores from the engine compartment of the vehicle through the front-of-dash wall. This requirement is labor intensive and time consuming, and is therefore costly.

Some conventional HVAC assemblies have responded to the burdens and inconveniences associated with having to pull both drains through the front-of-dash wall prior to accessing the evaporator core by incorporating a common drain for the evaporator and heater cores. The common drain extends from the casing for the evaporator core.

However, this response has been largely deficient because the common drain shares the drainage, or flow, of both the evaporator condensate and the liquid from the heater core without partitioning the flow. In such assemblies, without a partition, the evaporator condensate frequently 'back-flows' into the casing for the heater core where it can contaminate, or inadvertently humidify, the air, which is undesirable. This back-flow is referred to in the art as "cross-talk." Because the air in the heater casing has just been heated by the heater core, it particularly susceptible to 'taking-up' moisture from any source possible. Furthermore, manufacturing HVAC assemblies such that the common drain extends from the evaporator casing, as opposed to the heater casing, is particularly undesirable because it is more difficult to remove the evaporator casing from the vehicle than the heater casing.

Due to the inefficiencies identified in such conventional HVAC assemblies, it is desirable to provide a HVAC assembly having a drain portion extending from a casing for a heater core that includes a partition capable of separating condensate from an evaporator core and other liquid from the heater core thereby preventing cross-talk.

SUMMARY OF THE INVENTION

A heating, ventilating, and air conditioning (HVAC) assembly for a motor vehicle is disclosed. The HVAC assembly includes an evaporator core, enclosed by an evaporator casing, for cooling air, and a heater core, enclosed by a heater casing, for heating the air. The evaporator core generates condensate as the air is cooled.

The subject invention includes a drain portion extending from the heater casing. Because the drain portion of the subject invention extends from the heater casing, and not the evaporator casing, and because, as described above, the heater casing is more easily removed from the vehicle than the evaporator casing, the HVAC assembly of the subject invention enables a repair operator to quickly access the evaporator core and repair or otherwise maintain the evaporator core more efficiently and cost-effectively than the prior art.

Further, the drain portion includes a partition. The partition defines a first basin and a second basin. The first basin is in fluid communication with the evaporator core for collecting and draining the condensate from the evaporator core, and the second basin in fluid communication with the heater core for collecting and draining liquid from the heater core. The partition operates to separate the condensate collected from the evaporator core from the liquid collected from the heater core as the condensate and liquid are drained from the assembly. As such, the condensate is prevented from back flowing into the heater casing and inadvertently humidifying the air in the heater casing.

Accordingly, the subject invention provides a HVAC assembly including a drain portion extending from the heater casing. Additionally, the drain portion of the subject invention includes a partition operating to separate the evaporator condensate from any liquids from the heater core as the condensate and liquids are drained from the assembly.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
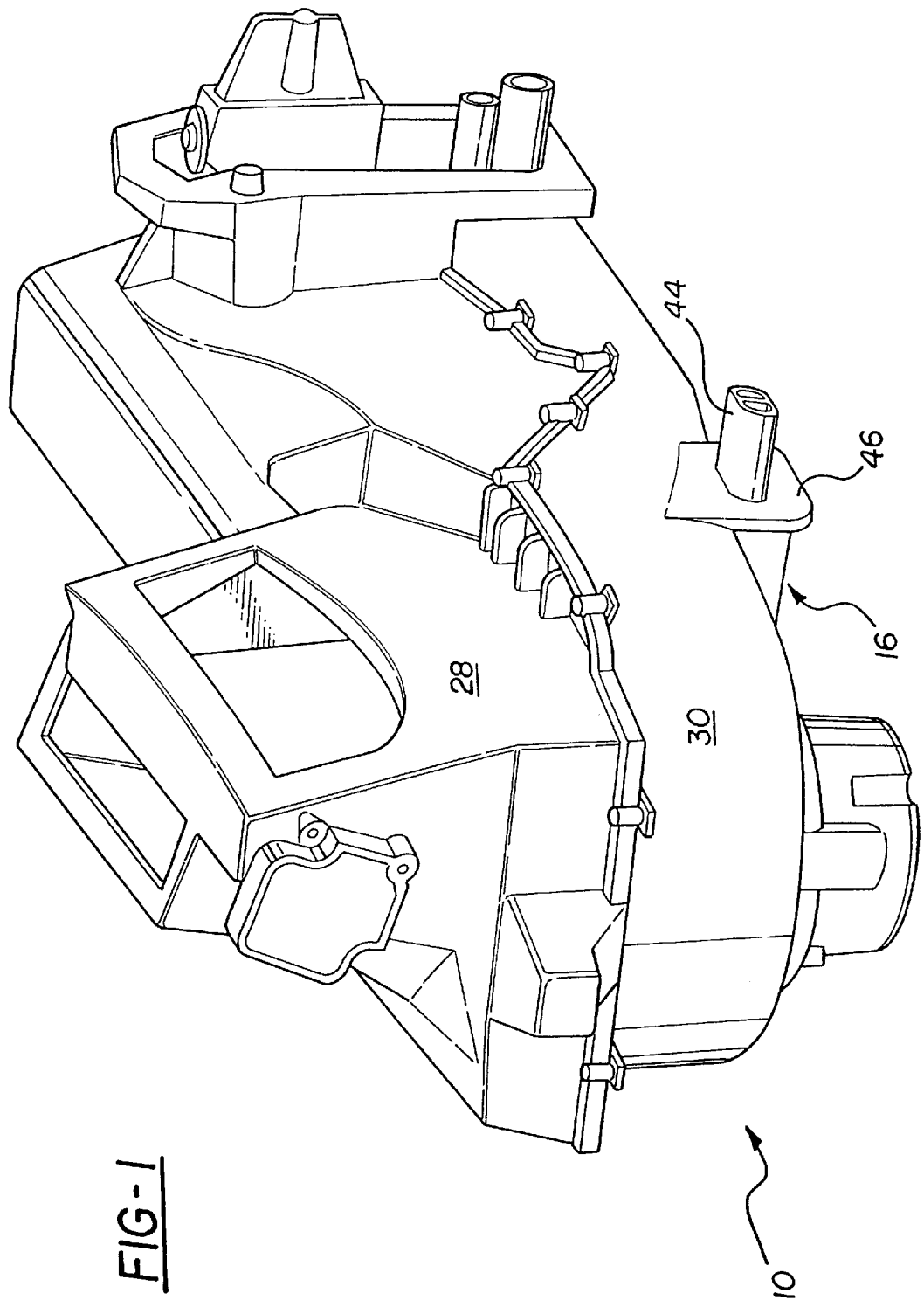
FIG. 1 is a perspective view of an HVAC assembly according to the subject invention illustrating a location of a drain portion.

Referring to the Figures, wherein like numerals indicate like or corresponding parts throughout the several views, a heating, ventilating, and air conditioning (HVAC) assembly for a motor vehicle is generally shown at 10. An assembled HVAC assembly 10 is represented in FIG. 1. As appreciated by those skilled in the art. the HVAC assembly 10 cools and heats air drawn into the assembly 10 that circulates into a passenger compartment 11 or the motor vehicle. Although not shown in detail, it is to be understood that the HVAC assembly 10 is disposed, or mounted in, the passenger compartment 11 of the vehicle, preferably under a dashboard.

The HVAC assembly 10 includes an evaporator core 12 responsible for cooling the air, and a heater core 14 responsible for heating the air. More specifically, a blower and scroll housing of the assembly 10, not shown in detail in the Figures, draw air into the assembly 10 and force the air through the assembly 10 first through the evaporator core 12, and then toward the heater core 14. As such, the air drawn into the assembly 10 always flows through the evaporator core 12, but the evaporator core 12 may not have refrigerant flowing through it to cool the air. Alternatively, the heater core 14 has a continuous flow of hot engine coolant flowing through it to heat the air. However, the air drawn into the assembly 10 does not always flow through the heater core 14. That is, the assembly 10 selectively controls the flow of air through the heater core 14.

It is understood that evaporator condensate is generated at the evaporator core 10 as the evaporator core 12 cools the air. It is further understood that liquids, such as condensate from the heater core 14 or possibly even engine coolant from the heater core 14, may flow from the heater core 14. The subject invention incorporates a drain portion 16 extending through a front-of-dash wall 18 (refer to FIG. 3) of the vehicle for draining both the evaporator condensate and the liquid from the heater core 14. While the flow of condensate generated at the evaporator core 12 is frequent, depending on environmental conditions known in the art, the flow of liquid from the heater core 14 is not as frequent. In fact, it may even be the case that there is no liquid flowing from the heater core 14. However, it is still desirable to provide the drain portion 16 capable of draining the liquid, if any, from the heater core 14. The subject invention enables the evaporator condensate and the liquid from the heater core 14 to be drained from the passenger compartment 11, where the assembly 10 is located, through the front-of-dash wall 18, and into an engine compartment 20 of the vehicle where it is ideal for the condensate and liquids to drain to the ground. The drain portion 16 will be described further hereinbelow.

Figure 2:
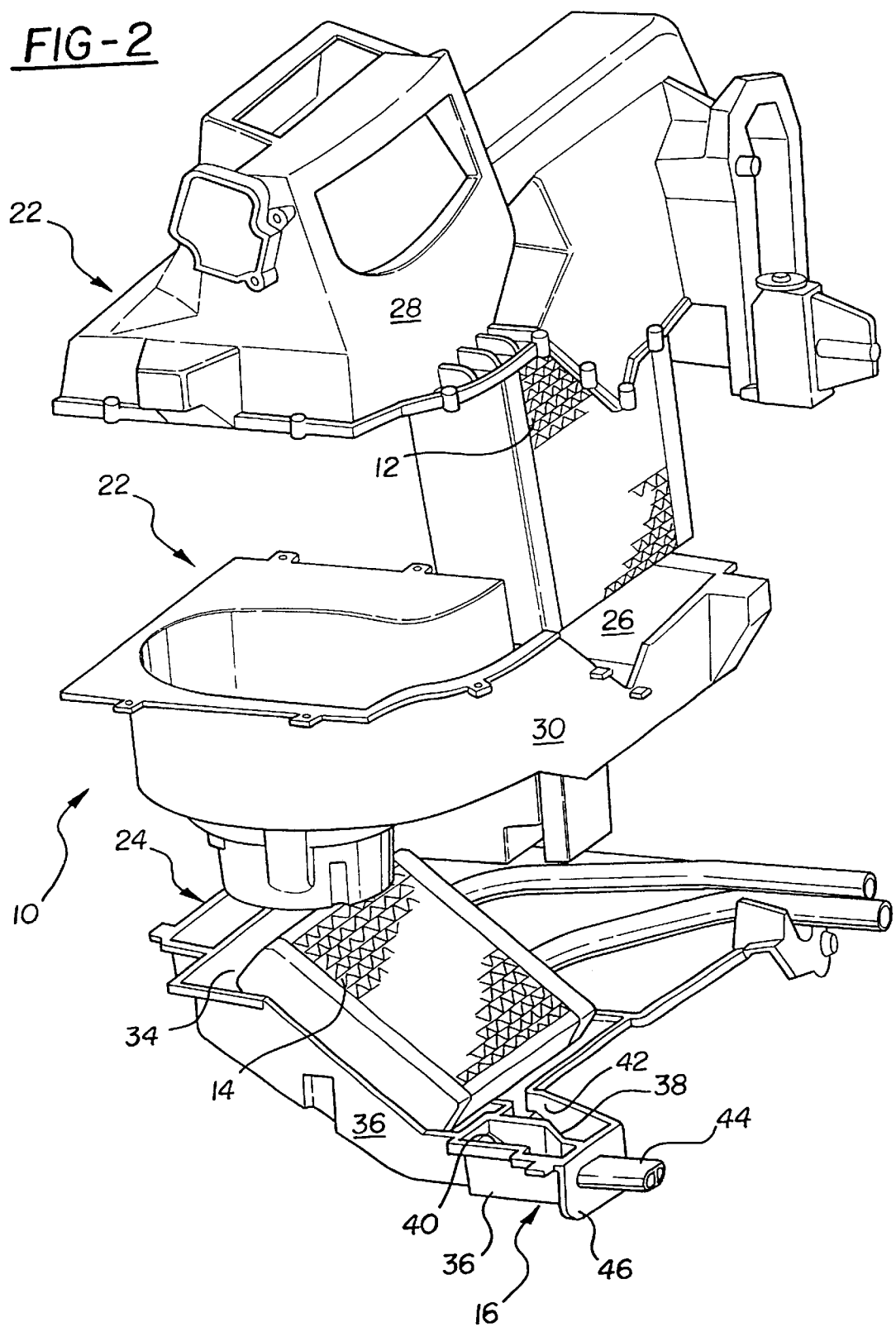
FIG. 2 is an exploded perspective view of the HVAC assembly in FIG. 1 generally illustrating an evaporator core, first and second evaporator covers, a heater core, a heater casing, and the drain portion of the subject invention.
Figure 3:
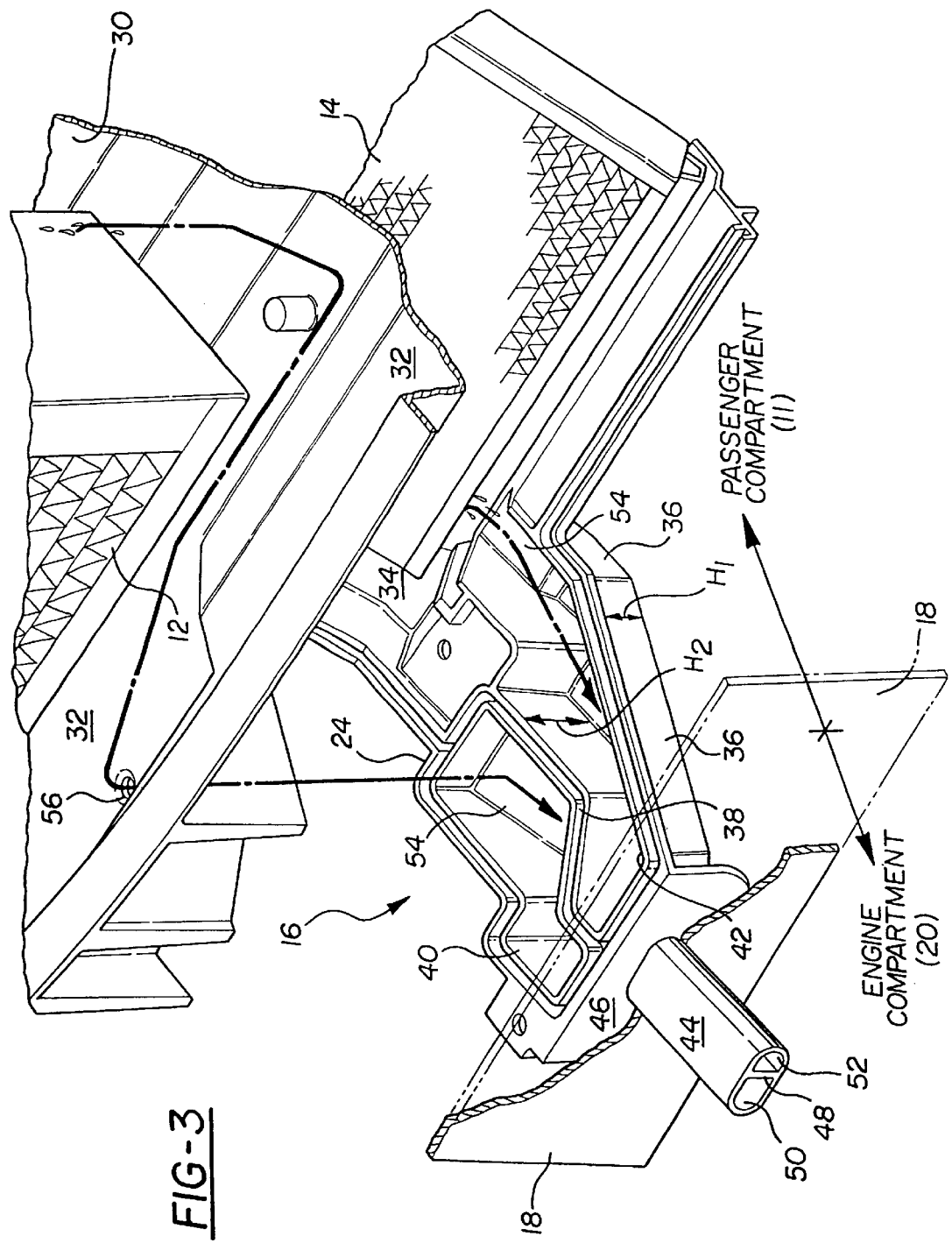
FIG. 3 is an enlarged perspective view illustrating first and second basins for separately draining condensate from the evaporator core and liquid from the heater core, respectively, as defined by a partition of the drain portion.

Referring now to FIGS. 2 and 3, the HVAC assembly 10 of the subject invention includes an evaporator casing 22 and a heater casing 24. The evaporator casing 22 at least partially encloses the evaporator core 12 thereby forming an evaporator cavity 26 surrounding the evaporator core 12 where the air is cooled. More specifically, the evaporator casing 22 is defined by first and second evaporator covers 28, 30, respectively, that partially enclose the evaporator core 12. As shown in the Figures, the first evaporator cover 28 is an upper evaporator cover, and the second evaporator cover 30 is a lower evaporator cover. As such, for descriptive purposes only, the subject invention will be described hereinbelow only in terms of the upper and lower evaporator covers 28, 30 respectively. However, it is to be understood that the first and second evaporator covers 28, 30 could also be right and left evaporator covers without varying the scope of the subject invention. That is, an assembly that splits the evaporator casing vertically, as opposed to horizontally as in the subject invention, and incorporates right and left evaporator covers to at least partially enclose the evaporator core 12 is intended to be covered by the subject invention.

In the preferred embodiment of the subject invention, the upper and lower evaporator covers 28, 30 completely enclose the evaporator core 12 once the assembly 10 is assembled (refer to FIG. 1). The evaporator casing 22 includes a drain path 32, as shown in FIG. 3, for directing the condensate generated from the evaporator core 12. The drain path 32 is disposed in the lower evaporator cover 30. The function of the drain path 32 will be described further hereinbelow.

The heater casing 24 at least partially encloses the heater core 14. The heater casing 24 forms a heater core cavity 34 surrounding the heater core 14 where the air is heated. The heater casing 24 includes external walls 36 that support the heater core 14 and partially define the heater core cavity 34. The external walls 36 of the heater casing 24 include a height $H_1$, the importance of which will be understood below. Additionally, as shown in both FIGS. 1 and 2, the heater casing 24 is mounted to and underneath the upper and lower evaporator covers 28, 30 as the assembly 10 would be installed in the vehicle.

The subject invention further includes the drain portion 16 extending from the heater casing 24. At one end, the drain portion 16 extends through the front-of-dash wall 18 of the vehicle and into the engine compartment 20. As illustrated in FIG. 3, the drain portion 16 is integrally formed with the heater casing 24 to extend from the heater casing 24. In the preferred embodiment of the subject invention. the heater casing 24 is actually molded to define the drain portion 16. Alternatively, without varying the scope of the subject invention, it is possible for the drain portion 16 to be externally mounted to the heater casing 24. By locating the drain portion 16 to extend from the heater casing 24 and not the evaporator casing 22, it is easier to service the evaporator core 12 because the heater casing 24, including the drain portion 16 which must be pulled out through the front-of-dash wall 18. is more easily removed from the vehicle than an evaporator casing having the drain portion 16.

The drain portion 16 includes a partition 38 having a height $H_2$. The partition 38 of the subject invention defines a first basin 40 and a second basin 42 in the heater casing 24. As represented by the Arrows in FIG. 3, the first basin 40 is in fluid communication with the evaporator core 12. As such, the first basin 40 is located in the heater casing 24 and operates as a drain for the evaporator core 12 to collect and drain the condensate from the evaporator core 12. The second basin 42 is in fluid communication with the heater core 14. As such, the second basin 42 collects and drains the liquid from the heater core 14. The drain portion 16 is considered a 'dual-functional' drain portion 16 because it can separately collect and drain both the condensate from the evaporator core 12 and the liquid from the heater core 14.

The heater casing 24 is molded to include the partition 38, and the first and second basins 40, 42. Because the drain for the evaporator core 12 is located in the heater casing 24, the functional purpose of the partition 38 is to prevent the condensate collected from the evaporator core 12 from back-flowing into the cavity 34 surrounding the heater core 14. Therefore, the partition 38 prevents the air in the heater core 14 from inadvertent humidification by the condensate from the evaporator core 12, which, as discussed above, is undesirable.

The size of each basin 40, 42, which contributes to the amount of flow they can handle from the evaporator and heater cores 12, 14, respectively, is defined on one side of each basin 40, 42 by the height $H_1$ of the external wales 36 of the heater casing 24. On the other side, the basins 40, 42 share the partition 38 of the subject invention. As a result, the size of each basin 40, 42 is defined on the other side by the height $H_2$ of the partition 38. In the preferred embodiment of the subject invention, the height $H_2$ of the partition 38 is greater than or equal to the height $H_1$ of the external walls 36 for separating the condensate in the first basin 40 from the liquid in the second basin 42.

The drain portion 16 more specifically includes a drain conduit 44 extending from the basins 40, 42. The drain conduit 44 is adapted to extend through the front-of-dash wall 18 and into the engine compartment 20. The assembly 10 includes a flange 46 that supports a seal, not shown in the Figures, for sealing the passenger compartment 11 from the engine compartment 20. As such, moisture from the engine compartment 20 can not penetrate into the passenger compartment 11 where the drain conduit 44 extends through the front-of-dash wall 18 and into the engine compartment 20.

The drain conduit 44 includes a channel partition 48 that defines first and second channels 50, 52, respectively for draining any condensate or liquid. The first and second channels 50, 52 of the drain conduit 44 are in fluid communication with the first and second basins 40, 42 of the drain portion 16, respectively. That is, the first channel 50 is an outlet for the drain for the evaporator core 12, and the second channel 52 is an outlet for draining the liquid from the heater core 14. The basins 40, 42 each include at least one interior facing 54 which slopes toward the drain conduit 44. These faints 54 direct the condensate and liquid from the basins 54 and into the drain conduit 44. As a result, the first channel 50, or outlet, of the drain conduit 44 drains the condensate that has been collected in the first basin 40, and the second channel 52 of the drain conduit 44 drains the liquid from the second basin 42. As such, even in the drain conduit 44, the condensate collected from the first basin 40 remains separated from the liquid collected from the second basin 42, and both the condensate and liquid are drained from the assembly 10 without inadvertent and undesirable humidification of the air in the cavity 34 surrounding the heater core 14.

The first and second channels 50, 52 each include an inner diameter. The subject invention anticipates that the volume of condensate generated from the evaporator core 12 is greater than the volume of liquid, if any, flowing from the heater core 14. As a result, the inner diameter of the first channel 50 is manufactured equal to or greater than the inner diameter of the second channel 52 to handle the greater volume of evaporator condensate.

The drain path 32 of the lower evaporator cover 30 directs the condensate from the evaporator core 12 to the drain portion 16. More specifically, the drain path 32 includes a condensate drain port 56. The drain port 56 included in the drain path 32 is aligned to be in fluid communication with the first basin 40 of the drain portion 16. As such, the condensate from the evaporator core 12 flows through the drain path 32 to the condensate drain port 56 where it flows, by gravity, to the first basin 40 for ultimate draining through the drain conduit 44 and into the engine compartment 20 where the condensate falls to the ground.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwvise than as specifically described.

What is claimed is:

1. A heating, ventilating, and air conditioning assembly for a motor vehicle, said assembly comprising:
   an evaporator core for cooling air, said evaporator core generating condensate as the air is cooled;
   an evaporator casing at least partially enclosing said evaporator core;
   a heater core for heating the air;
   a heater casing at least partially enclosing said heater core; and
   a drain portion extending from one of said evaporator casing and said heater casing, said drain portion including a partition defining a first basin in fluid communication with said evaporator core for collecting and draining the condensate from said evaporator core, and a second basin in fluid communication with said heater core for collecting and draining any liquid from said heater core such that the condensate collected from said evaporator core remains separated from the liquid collected from said heater core.

2. An assembly as set forth in claim 1 wherein said drain portion is integrally formed with said heater casing and extends from said heater casing.

3. An assembly as set forth in claim 2 wherein said heater casing is molded to integrally define said drain portion including said first and second basins.

4. An assembly is set forth in claim 1 wherein said drain portion further includes a drain conduit in fluid communication with and extending from said basins.

5. An assembly as set forth in claim 4 wherein said basins each include at least one interior facing that slopes toward said drain conduit for directing the condensate and the liquid from said basins and into said drain conduit.

6. An assembly as set forth in claim 4 wherein said drain conduit includes a channel partition defining a first channel in fluid communication with said first basin for collecting and draining the condensate from said first basin, and a second channel in fluid communication with said second basin for collecting and draining the liquid from said second basin such that the condensate collected from said first basin remains separated from the liquid collected from said second basin.

7. An assembly as set forth in claim 6 wherein said first and second channels of said drain conduit each include an inner diameter and said inner diameter of said first channel is equal to or greater than said inner diameter of said second channel.

8. An assembly as set forth in claim 6 wherein said drain conduit is adapted to extend through a front-of-dash wall and into an engine compartment of the vehicle.

9. An assembly as set forth in claim 8 further including a flange adapted to mount said drain portion to the front-of-dash wall such that said drain conduit extends through said flange and the front-of-dash wall and into the engine compartment of the vehicle for draining the condensate and the liquid into the engine compartment.

10. An assembly as set forth in claim 1 further including an evaporator casing at least partially enclosing said evaporator core, said evaporator casing including a drain path for directing the condensate generated from said evaporator core to said drain portion.

11. An assembly as set forth in claim 10 wherein said evaporator casing is further defined by first and second evaporator covers at least partially enclosing said evaporator core.

12. An assembly as set forth in claim 11 wherein said heater casing is mounted to and underneath said first and second evaporator covers.

13. An assembly as set forth in claim 11 wherein said drain path is disposed in said second evaporator cover.

14. An assembly as set forth in claim 13 wherein said drain path of said evaporator casing includes a condensate drain port aligned with said first basin of said drain portion such that said drain path is in fluid communication with said first basin as the condensate from said evaporator core drains into said first basin.

15. An assembly as set forth in claim 1 wherein said heater casing includes external walls defining a cavity, said external walls of said heater casing including a height $H_1$.

16. An assembly as set forth in claim 15 wherein said partition of said drain portion includes a height $H_2$, wherein said height $H_2$ of said partition is greater than or equal to said height $H_1$ for separating the condensate in said first basin from the liquid in said second basin.

17. A heating, ventilating, and air conditioning assembly for a motor vehicle, said assembly comprising:

an evaporator core for cooling air, said evaporator core generating condensate as the air is cooled;

an evaporator drain disposed below said evaporator core, said drain for collecting the condensate generated from said evaporator core;

a heater core for heating the air;

a heater casing at least partially enclosing said heater core, and said evaporator drain including an outlet disposed in said heater casing for collecting and draining the condensate from said evaporator core wherein said outlet of said evaporator drain includes a partition for preventing the condensate collected from said evaporator core from mixing with any liquid collected from said heater core.

18. A motor vehicle comprising:

(A) a front-of-dash wall defining an engine compartment and a passenger compartment of said vehicle; and (B) a heating, ventilating, and air conditioning assembly disposed in said passenger compartment of said vehicle, said assembly comprising;
  (i) an evaporator core for cooling air, said evaporator core generating condensate as the air is cooled,
  (ii) an evaporator casing at least partially enclosing said evaporator core;
  (iii) a heater core for heating the air,
  (iv) a heater casing at least partially enclosing said heater core, and
  (v) a drain portion extending from one of said evaporator casing and said heater casing and through said front-of-dash wall into said engine compartment of said vehicle, said drain portion including a partition defining a first basin in fluid communication with said evaporator core for collecting and draining the condensate from said evaporator core, and a second basin in fluid communication with said heater core for collecting and draining any liquid from said heater core such that the condensate collected from said evaporator core remains separated from the liquid collected from said heater core.

19. A vehicle as set forth in claim 18 wherein said drain portion of said assembly extends from said heater casing.

20. A vehicle as set forth in claim 18 wherein said drain portion of said assembly further includes a drain conduit in fluid communication with and extending from said basins.

21. A vehicle as set forth in claim 20 wherein said drain conduit extends through said front-of-dash wall into said engine compartment of said vehicle.

22. A vehicle as set forth in claim 21 further including a flange for mounting said drain portion to said front-of-dash wall such that said drain conduit extends through said flange and said front-of-dash wall into said engine compartment of said vehicle for draining the condensate and the liquid into said engine compartment.

* * * * *